United States Patent [19]

Zondler et al.

[11] 4,129,556
[45] Dec. 12, 1978

[54] CURABLE EPOXIDE RESIN MIXTURES

[75] Inventors: Helmut Zondler, Bottmingen; Roland Moser, Basel, both of Switzerland

[73] Assignee: Ciba-Geigy Corporation, Ardsley, N.Y.

[21] Appl. No.: 856,892

[22] Filed: Dec. 2, 1977

[30] Foreign Application Priority Data

Dec. 10, 1976 [CH] Switzerland .................. 15574/76

[51] Int. Cl.² ............................................. C08G 59/50
[52] U.S. Cl. ................................. 528/97; 260/37 EP; 260/830 TW; 528/98; 528/99; 528/102
[58] Field of Search ............ 260/47 EN, 2 N, 570.5 P

[56] References Cited

U.S. PATENT DOCUMENTS

| 2,837,497 | 6/1958 | Delmonte | 260/47 |
| 3,278,596 | 10/1966 | Pursglove | 260/558 |
| 3,751,471 | 8/1973 | Becker | 260/570.5 P |
| 3,763,102 | 10/1973 | Hoffmann et al. | 260/47 EN |

Primary Examiner—Harold D. Anderson
Assistant Examiner—E. A. Nielsen
Attorney, Agent, or Firm—Vincent J. Cavalieri; Joseph F. DiPrima

[57] ABSTRACT

Curable mixtures containing (a) a polyepoxide compound having on average more than one epoxide group per molecule and (b) a diamine which contains hydroxyl groups and has the general formula Ia or Ib

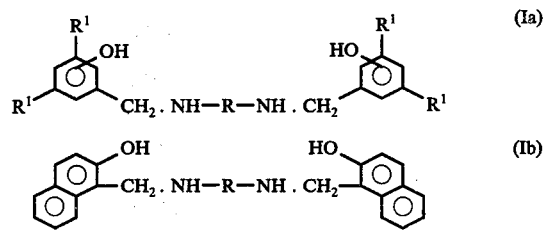

in which R is an alkyl radical having 2 to 16 C atoms, an aralkylene radical having 7 to 12 C atoms, an arylene radical having 6 to 16 C atoms, a cycloaliphatic radical having 6 to 12 C atoms or a radical containing at least one N, O or S atom in chains or cyclic groups, and $R_1$ is a hydrogen atom, a halogen atom or an alkyl group having 1 to 4 C atoms and in which, in formula Ia, the two OH groups are in the orthoposition or para-position relative to the methylene group, there being, in the mixtures, 0.5 to 1.5 equivalents of active hydrogen atoms, which are bonded to nitrogen and oxygen in the diamine containing hydroxyl groups, per 1 equivalent of epoxide groups.

9 Claims, No Drawings

CURABLE EPOXIDE RESIN MIXTURES

The present invention relates to curable mixtures containing (a) a polyepoxide compound having on average more than one epoxide group per molecule and (b) a diamine which contains hydroxyl groups and has the general formula Ia or Ib

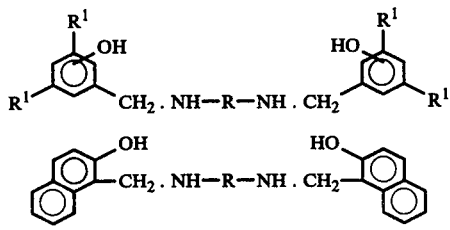

in which R is a straight-chain or branched alkylene radical having a total of 2 to 16 C atoms, an aralkylene radical having a total of 7 to 12 C atoms, an arylene radical having a total of 6 to 16 C atoms, a cycloaliphatic or cycloaliphaticaliphatic radical having 6 to 12 C atoms or a radical which contains at least one N, O or S atom in chains or cyclic groups and $R_1$ is a hydrogen atom, a halogen atom, preferably a chlorine atom, or an alkyl group having 1 to 4 C atoms, preferably methyl, and in which, in formula Ia, the two OH groups are in the ortho-position or para-position relative to the methylene group, there being, in the mixtures, 0.5 to 1.5 equivalents of active hydrogen atoms, which are bonded to nitrogen and oxygen in the diamine containing hydroxyl groups, per 1 equivalent of epoxide groups.

The mixtures according to the invention preferably contain, as diamine (b), a bis-(2-hydroxybenzyl)-diamine of the formula II

in which R is a straight-chain or branched alkylene radical having a total of 2 to 16 C atoms or an aralkylene radical having a total of 7 to 12 C atoms or an arylene radical having a total of 6 to 16 C atoms or a radical which contains at least one N, O or S atom in chains or cyclic groups.

The nearest comparable prior art is German Auslegeschrift No. 1,951,524, which describes the use of polyether-amine condensation products, which, like the bis-(2-hydroxybenzyl)-diamines of the above formula Ia, also contain phenolic OH groups and secondary amino groups. In contrast to the curing agents of the formula Ia used according to the invention, these polyether-amine condensation products, when mixed with epoxide resins, give oily compositions with relatively low softening ranges. The corresponding curable mixtures can therefore not be used in the form of sintering powders; i.e. they are unsuitable for whirl-sintering, flame-spraying and powder-coating in general. Quite generally, these compositions are also not very suitable for the production of the B-stages (pre-reacted products) which are used, for example, as compression moulding compositions or for pre-pregs for the production of laminates. The glass transition temperatures of the cured articles according to this German Auslegeschrift are also relatively low, from which it can be concluded that the dimensional stability when hot is moderate. The mechanical properties are also not very satisfactory. Similarly, the crosslinking agents for epoxide resins in German Offenlegungsschrift No. 2,220,864, which are obtained by mixing substituted phenols with 3,5,5-trimethyl-3-aminomethylcyclohexylamine or methanediamine, are viscous liquids which are unsuitable as sintering powders.

Surprisingly, the curable mixtures according to the invention do not have the disadvantages of the systems described in German Auslegeschrift No. 1,951,524 and ultimately result in cured articles which, in respect to the mechanical and electrical properties, are superior to the cured articles which are obtained according to this particular prior art. The mixtures according to the invention are especially suitable for the production of B-stages which have high stability on storage but are reactive. In this respect, the said mixtures are also superior to the known curable epoxide resin mixtures which contain aliphatic or cycloaliphatic amines as curing agents and which result in articles having good mechanical values.

This is because mixtures of this type containing aliphatic and cycloaliphatic amines are virtually unsuitable for the production of B-stages because they are too highly reactive. Surprisingly, it was also possible to establish that the mixtures according to the invention, in contrast to the mixtures of the last-mentioned prior art, do not lead to yellowing of the mouldings in the course of curing.

The mixtures according to the invention contain, in particular, a bis-(2-hydroxybenzyl)-diamine of the formula II in which R is an unbranched or branched alkylene radical having 2 to 12 C atoms.

A further preferred embodiment of the invention comprises those mixtures which contain a bis-(2-hydroxybenzyl)-diamine of the formula II in which R is a divalent radical of the formula III

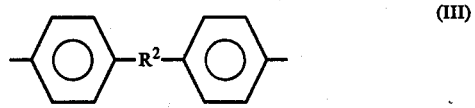

in which $R^2$ is one of the divalent radicals —SO$_2$—, —NH— and —O—, or in which R is a divalent radical of the formula IV

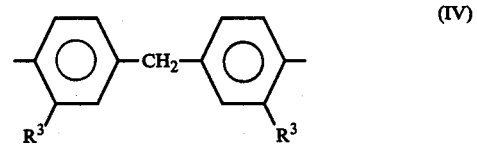

in which $R^3$ is H or —CH$_3$, or in which R is a divalent radical of the formula V

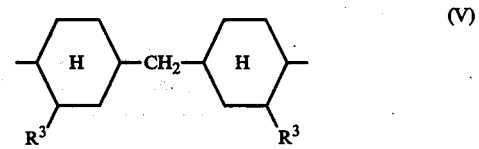

in which R³ is H or —CH₃.

Particularly useful mixtures are those which contain, as the curing agent, a bis-(2-hydroxybenzyl)-diamine of the formula II in which R is has formula IV and R³ is H or —CH₃.

A further preferred embodiment of the invention comprises those mixtures which contain a bis-(2-hydroxybenzyl)-diamine of the formula II in which R is a divalent radical

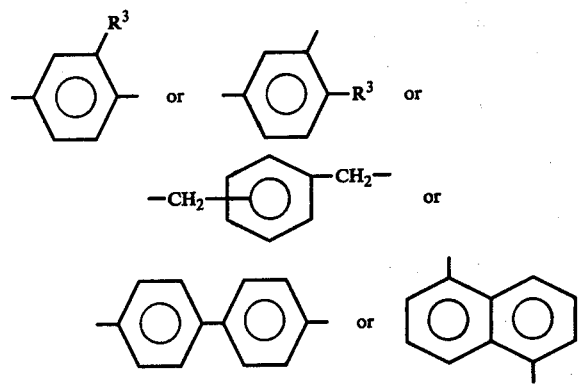

The best results from application of the invention are obtained when the mixtures contain, as bis-(2-hydroxybenzyl)-diamines, those compounds which are solid at room temperature. Special mixtures of this type are also a preferred embodiment of the invention.

The bis-(2-hydroxybenzyl)-diamines of the formula I contained in the curable mixtures according to the invention are known per se. In this context, reference may be made, for example, to a publication by A. Funke in Bull. Soc. Chim. 9 (1942) 806–808, in which N,N'-bis-(2-hydroxybenzyl)-ethylene-diamine is described. In the method described in this publication, the preparation is effected by reduction of the Schiff's base of 2 mols of salicylaldehyde and 1 mol of ethylenediamine in an alcoholic medium by means of sodium.

The diamines of the formula Ia and Ib can also be prepared by a condensation reaction of phenols with diamines in the presence of formaldehyde or paraformaldehyde. The process for the preparation of such compounds is described by W. J. Burke in J. Americ. Chem. Soc. 71, (1949) 609–612 and 74 (1952) 3601–3605. A further publication relating to this process is also to be found in Chem. Abstracts 62 (1965), Volume 62, 90,467.

The bis-(2-hydroxybenzyl)-diamines of the formula Ia and Ib are best prepared in a pure form by subjecting a bisazomethine of the general formula VI

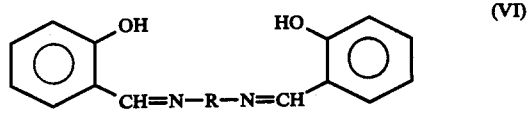 (VI)

to catalytic hydrogenation in the presence of inert organic solvents at temperatures of 20° to 150° C. and freeing the resulting product from the catalyst and solvents in a known manner.

The bis-(2-hydroxybenzyl)-diamines prepared by this method are particularly suitable for the preparation of the curable mixtures according to the invention.

Since the bis-(2-hydroxybenzyl)-diamines of the formula Ia or Ib are all solid or highly viscous substances, brief heating of the components is as a rule necessary for the preparation of the mixtures according to the invention, even when liquid epoxide resins are used. This measure ensures that a homogeneous mixture is obtained. In principle, however, the mixture according to the invention can also be prepared by mechanical mixing of highly disperse bis-(2-hydroxybenzyl)-diamines with the particular liquid or solid and likewise highly disperse epoxide resin. In all cases, the B-stage is always produced after storing for a few days at room temperature (for example 1 to 14 days) or at slightly elevated temperature (for example 60° C.; 1 hour); the reactivity of this B-stage virtually no longer changes with time and the B-stage is thus stable on storage.

These B-stages which are stable on storage are a further subject of this invention.

Polyepoxide compounds which can be used in the curable mixtures according to the invention are, in particular, those having, on average, more than one glycidyl group, β-methylglycidyl group or 2,3-epoxycyclopentyl group bonded to a hetero-atom (for example sulphur and preferably oxygen or nitrogen); preferred compounds are bis-(2,3-epoxycyclopentyl) ether; di- and poly-glycidyl ethers of polyhydric aliphatic alcohols, such as 1,4-butanediol, or polyalkylene glycols, such as polypropylene glycols; di- or poly-glycidyl ethers of cycloaliphatic polyols, such as 2,2-bis-(4-hydroxycyclohexyl)propane; di- and poly-glycidyl ethers of polyhydric phenols, such as resorcinol, bis-(p-hydroxyphenyl)-methane, 2,2-bis-(p-hydroxyphenyl)-propane (= diomethane), 2,2-bis-(4'-hydroxy-3',5'-dibromophenyl)-propane and 1,1,2,2-tetrakis-(p-hydroxyphenyl)-ethane, or of condensation products of phenols and formaldehyde which are obtained under acid conditions, such as phenol novolacs and cresol novolacs; di- and poly-(β-methylglycidyl) ethers of the polyhydric alcohols or polyhydric glycidyl) ethers of the polyhydric alcohols or polyhydric phenols listed above; polyglycidyl esters of polybasic carboxylic acids, such as phthalic acid, terephthalic acid, Δ⁴-tetrahydrophthalic acid and hexahydrophthalic acid; N-glycidyl derivatives of amines, amides and heterocyclic nitrogen bases, such as N,N-diglycidylaniline, N,N-diglycidyltoluidine and N,N,N',N'-tetraglycidyl-bis-(p-aminophenyl)methane; triglycidyl isocyanurate; N,N'-diglycidylethyleneurea; N,N'-diglycidyl-5,5-dimethyl-hydantoin and N,N'-diglycidyl-5-isopropyl-hydantoin; and N,N'-diglycidyl-5,5-dimethyl-6-isopropyl-5,6-dihydro-uracil.

If desired, active diluents, for example styrene oxide, butyl glycidyl ether, isooctyl glycidyl ether, phenyl glycidyl ether, cresyl glycidyl ether or glycidyl esters of synthetic, highly branched and in the main tertiary, aliphatic monocarboxylic acids ("CARDURA E"), can be added to the polyepoxides in order to lower the viscosity.

Curing of the curable mixtures according to the invention to give mouldings and the like is appropriately effected in the temperature range of 20° to 160° C. Curing can also be carried out in two or more stages in a known manner, in which case the first curing stage is carried out at a lower temperature and after-curing is carried out at a higher temperature. The first stage can result in the B-stage, which has already been discussed and which plays an important role in the production of "prepregs", compression moulding compositions or, especially, sintering powders.

In order to shorten the gelling and curing times of the mixtures according to the invention, known accelerators for amine curing, for example monophenols or polyphenols, such as phenol or diomethane, salicyclic acid, tertiary amines or salts of thiocyanic acid, such as NH₄SCN, can be added.

Furthermore, customary modifiers, such as extenders, fillers and reinforcing agents, pigments, dyes, organic solvents, plasticisers, flow control agents, thixotropic agents, flame retardants and mould release agents, can be added to the curable mixtures, according to the invention, of polyepoxide compounds and bis-(2-hydroxybenzyl)-diamines of the formula Ia and Ib at any stage prior to final curing.

The following may be mentioned as examples of extenders, reinforcing agents, fillers and pigments which can be employed in the curable mixtures according to the invention: coal tar, bitumen, liquid coumarone/indene resins, textile fibres, glass fibres, asbestos fibres, boron fibres, carbon fibres, cellulose, polyethylene powders and polypropylene powders; quartz powders; mineral silicates, such as mica, asbestos powder or slate powder; kaolin, aluminium oxide trihydrate, chalk powder, gypsum, antimony trioxide, bentones, silica aerogel ("AEROSIL"), lithopones, baryte, titanium dioxide, carbon black, graphite, oxide colours, such as iron oxide, or metal powders, such as aluminium powder or iron powder.

Suitable organic solvents for modifying the curable mixtures are, for example, toluene, xylene, n-propanol, butyl acetate, acetone, methyl ethyl ketone, diacetone alcohol, ethylene glycol monomethyl ether, ethylene glycol monoethyl ether and ethylene glycol monobutyl ether.

Examples of plasticisers which can be employed for modifying the curable mixtures are dibutyl phthalate, dioctyl phthalate and dinonyl phthalate, tricresyl phosphate, trixylenyl phosphate, diphenoxyethylformal and polypropylene glycols.

Substances which can be added as flow control agents when the curable mixtures are employed in particular in surface protection are, for example, silicones, liquid acrylic resins, cellulose acetobutyrate, polyvinylbutyral, waxes, stearates and the like (some of which are also used as mould release agents).

Particularly for use in the lacquer field, the polyepoxide compounds can also be partially esterified in a known manner with carboxylic acids, such as, especially, higher unsaturated fatty acids. It is also possible to add other curable synthetic resins, for example phenoplastis or aminoplasts, to such resin varnish formulations.

The production of the curable mixtures according to the invention can be effected in a conventional manner with the aid of known mixing equipment (stirrers, kneaders, rolls or, in the case of solid powders, mills or dry mixers).

The curable epoxide resin mixtures according to the invention are employed in particular in the fields of surface protection, the electrical industry, laminating processes, adhesives technology and the building trade. They can be used in a formulation suited in each case to the particular application, in the unfilled or filled state, if appropriate in the form of solutions or emulsions, as paints, lacquers or solvent-free coatings, as sintering powders, compression moulding compositions, injection moulding formulations, dipping resins, casting resins, impregnating resins, binders and adhesives and as moulding resins, laminating resins, sealing and filling compositions, floor covering compositions and binders for mineral aggregates.

Examples (A) Preparation of the bis-(2-hydroxybenzyl)-diamines of the formula I

Example 1

(N,N'-Bis-(2-hydroxybenzyl)-ethylenediamine)

40.8 g of a bisazomethine prepared from 2 moles of salicylaldehyde and 1 mol of ethylenediamine and having a melting point of 127° C. are hydrogenated, at atmospheric pressure in a hydrogenation flask, in 200 ml of glacial acetic acid in the presence of 1.36 g of 10% platinum/charcoal catalyst at 25° C. After 12 hours, the catalyst is filtered off and used to hydrogenate a further 81.6 g of bisazomethine in 400 ml of glacial acetic acid. After 20 hours, the completely hydrogenated solution is separated from the catalyst and concentrated, together with the above filtrate, in a rotary evaporator. The solid residue is recrystallised from 700 ml of isopropanol, the mother liquor concentrated three times and the products are dried at 90° C. in vacuo, affording a total of 162.2 g of N,N'-bis-(2-hydroxybenzyl)-ethylenediamine diacetate which melts in the range of 120°-130° C.

To convert this product into the free base, the salt is dissolved in 162 ml of $H_2O$ and 200 ml of methanol and the solution is neutralised with 40 ml of 25% $NH_4OH$ solution at 40° C., whereupon the free base precipitates. The product dissolves on boiling and adding a further 100 ml of methanol. The solution is cooled, initially at room temperature and then in a refrigerator and the product is collected by filtration, washed with a mixture of 2 parts of $H_2O$ and 1 part of methanol and dried at 60° C. in vacuo. Yield: 111.2 g (89.5% of theory); melting point: 120-122° C.

| Analysis $C_{16}H_{20}N_2O_2$ (molecular weight = 272.35) | | | |
|---|---|---|---|
| calculated | C 70.56 | H 7.40 | N 10.29 |
| found | C 70.45 | H 7.35 | N 10.25 |

The NMR spectrum agrees with the structure: ppm values in deuterated dimethylsulphoxide 6.7 s (2 NH, 2 OH); 6.4–7.3 m (aromatic H); 3.8 s (2 $CH_2N$); and 2.7 s (2 $NCH_2$).

The diamine forms a dihydrochloride with a melting point of 213°-215° C. which can be recrystallised from ethanol with the addition of a small amount of $H_2O$.

EXAMPLE 2

(N,N'-Bis-(2-hydroxybenzyl)-hexamethylenediamine)

122.1 g of a bisazomethine prepared from 2 mols of salicylaldehyde and 1 mol of hexamethylenediamine and having a melting point of 72°-73° C. are hydrogenated in 550 ml of isopropanol in an autoclave in the presence of 8 g of Raney nickel at 75° C. and under a pressure of 90 atmospheres. The product crystallises out at room temperature and is dissolved by boiling with the addition of a further 650 ml of isopropanol. The catalyst is filtered off, and N,N'-bis-(2-hydroxybenzyl)-hexamethylenediamine crystallises out on cooling.

The crystalline product is collected by filtration at room temperature, washed with isopropanol and dried at 70° C. in vacuo.

Yield: 102.8 g (83.1% of theory). Melting point: 112°-113° C. 1.00 g is recrystallised from 10 ml of isopropanol. Yield: 0.92 g; melting point: 113° C.

| Analysis $C_{20}H_{28}N_2O_2$ (molecular weight = 328.46) | | | |
|---|---|---|---|
| calculated | C 73.14 | H 8.59 | N 8.53 |
| found | C 73.25 | H 8.57 | N 8.68 |

EXAMPLE 3

(N,N'-Bis-(2-hydroxybenzyl)-dodecamethylenediamine)

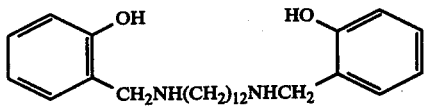

30.0 g of a bisazomethine prepared from 2 mols of salicylaldehyde and 1 mol of 1,12-diaminododecane and having a melting point of 72°-73° C. are hydrogenated for 2 hours in 300 ml of isopropanol in an autoclave in the presence of 3 g of Raney nickel at 90°-100° C. and under a pressure of 60 atmospheres The product crystallises out at room temperature and dissolves again on refluxing. The catalyst is filtered off and the diamine crystallises out. The mixture is cooled for two days in a refrigerator and the product is collected by filtration, washed with isopropanol and cyclohexane and dried at 60° C. in vacuo. Yield: 25.8 g (85.0% of theory); melting point 104°-106° C.

1.60 g are recrystallised from 16 ml of isopropanol. Yield: 1.52 g; melting point: p 105°-106° C.

| Analysis $C_{26}H_{40}N_2O_2$ (molecular weight = 412.62) | | | |
|---|---|---|---|
| calculated | C 75.68 | H 9.77 | N 6.79 |
| found | C 75.64 | H 9.80 | N 6.77 |

EXAMPLE 4

(N,N'-Bis-(2-hydroxybenzyl)-propylenediamine)

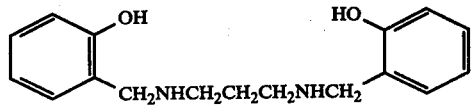

(a) 84.6 g of a bisazomethine prepared from 2 moles of salicylaldehyde and 1 mol of propylenediamine and having a melting point of 57°-58° C. are hydrogenated for 3 hours in 340 ml of isopropanol in an autoclave in the presence of 1.20 g of 5% platinum/charcoal at 45° C. and under a pressure of 50-60 atmospheres. The product crystallises out at room temperature and is dissolved by boiling, with the addition of a further 660 ml of isopropanol. The catalyst is filtered off and the diamine crystallises out on cooling. The crystals are collected by filtration, washed and dried, yielding 75.1 g of N,N'-bis-(2-hydroxybenzyl)-propylenediamine (87.5% of theory); melting point 109°-110° C.

A further 5.8 g of impure product with a melting point of 79°-83° C. are obtained by concentrating the mother liquor.

2.00 g of the first fraction are recrystallised from 10 ml of isopropanol; yield: 1.85 g; melting point: 109°-110° C.

| Analysis $C_{17}H_{22}N_2O_2$ (molecular weight = 286.36) | | | |
|---|---|---|---|
| calculated | C 71.30 | H 7.74 | N 9.78 |
| found | C 71.29 | H 7.64 | N 9.83 |

The H-NMR spectrum is in accord with the above structural formula.

(b) 183.2 g of the same bisazomethine as in Example 4a are hydrogenated for 4 hours in 920 ml of isopropanol in an autoclave in the presence of 18.3 g of Raney nickel at 75°-85° C. and under a pressure of 100 atmospheres. Working up as described in a) gives 162.0 g (87.2% of theory) of N,N'-bis-(2-hydroxybenzyl)-propylenediamine with a melting point of 109°-110° C.

EXAMPLE 5

(N,N'-Bis-(2-hydroxybenzyl)-2,5-diamino-2,5-dimethylhexane)

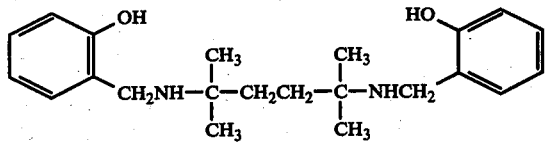

55.0 g of a bisazomethine prepared from 2 mols of salicylaldehyde and 1 mol of 2,5-diamino-2,5-dimethylhexane and with a melting point of 111°-112° C. are hydrogenated for 2 hours in 250 ml of ethanol in an autoclave in the presence of 5.5 g of Raney nickel at 100° C. and under a pressure of 80 atmospheres. The catalyst is filtered off and the filtrate is concentrated. The residue is recrystallised from 220 ml of ispropanol, collected by filtration, washed with n-hexane and dried in vacuo, affording 18.9 g (34% of theory) of N,N'-bis-(2-hydroxybenzyl)-2,5-diamino-2,5-dimethyl-hexane with a melting point of 102°-106° C. Two recrystallisations from a mixture of cyclohexane and ethanol yield 15.2 g of pure product with a melting point of 124°-125° C.

| Analysis $C_{22}H_{32}N_2O_2$ (molecular weight = 356.51) | | | |
|---|---|---|---|
| calculated | C 74.12 | H 9.05 | N 7.86 |
| found | C 73.90 | H 9.10 | N 7.92 |

EXAMPLE 6

(N,N'-Bis-(2-hydroxybenzyl)-m-xylylenediamine)

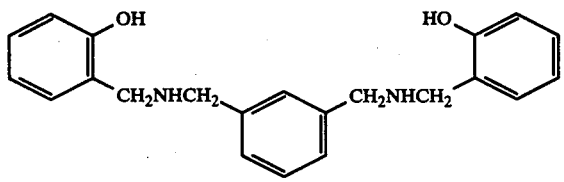

34.4 g of a bisazomethine prepared from 2 mols of salicylaldehyde and 1 mol of m-xylylenediamine and having a melting point of 61°–63° C. are hydrogenated for 7 hours in 170 ml of isopropanol in an autoclave in the presence of 4 g of Raney nickel at 85° C. and under a pressure of 60 atmospheres. The catalyst is filtered off and the filtrate is concentrated in a rotary evaporator to give 35.8 g of crude product. 25.7 g are recrystallised from 77 ml of isopropanol and the bulk of the product separates out on cooling in a refrigerator. The precipitate is collected by filtration, washed off with cold isopropanol and dried in vacuo at 40° C., affording 11.0 g (41.8% of theory) of N,N'-bis-(2-hydroxybenzyl)-m-xylylenediamine with a melting point of 67°–68° C.

| Analysis $C_{22}H_{24}N_2O_2$ (molecular weight = 348.45) | | | |
|---|---|---|---|
| calculated | C 75.83 | H 6.94 | N 8.04 |
| found | C 75.98 | H 7.08 | N 7.94 |

EXAMPLE 7

(N,N'-Bis-(2-hydroxybenzyl)-p-phenylenediamine)

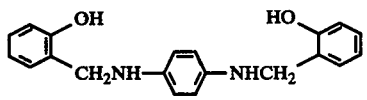

40.0 g of a bisazomethine prepared from 2 mols of salicylaldehyde and 1 mol of p-phenylenediamine and having a melting point of 210°–211° C. are hydrogenated for 11 hours in 250 ml of dioxane in an autoclave in the presence of 4 g of Raney nickel at 90° C. and under a pressure of 75 atmospheres. The catalyst is filtered off and the filtrate is concentrated in a rotary evaporator, giving 44.1 g of a crystalline crude product. The product dissolves to only a slight extent on boiling with 300 ml of ethanol. On cooling, it is collected by filtration, washed with ethanol and dried in vacuo at 60° C.

Yield: 20.2 g (50.0% of theory); melting point: 169°–171° C.

For analysis, 17.5 g are recrystallised from 95 ml of dioxane; yield: 11.4 g; melting point: 170°–171° C.

Analysis $C_{20}H_{20}N_2O_2$ (molecular weight = 320.39). Calculated: N 8.75. Found: N 8.55.

The H-NMR spectrum is in accord with the above structural formula

EXAMPLE 8

(N,N'-Bis-(2-hydroxybenzyl)-4,4'-diamino-diphenylmethane)

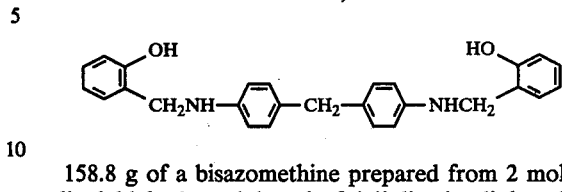

158.8 g of a bisazomethine prepared from 2 mols of salicylaldehyde and 1 mol of 4,4'-diaminodiphenylmethane and with a melting point of 213°–214° C. are hydrogenated for 7 hours in 1,220 ml of dioxane in an autoclave in the presence of 15 g of Raney nickel at 80° C. The catalyst is filtered off, the filtrate is concentrated and the residue is recrystallised from 500 ml of benzene. After cooling in a refrigerator, the product is collected by filtration, washed with benzene and dried in vacuo at 60° C. Yield: 107.4 g (66.9% of theory); melting point: 125°–126° C. The filtrate is concentrated, the residue is dissolved in a small amount of benzene and n-hexane is added until the solution just remains clear. On seeding, a further 13.4 g (8.4% of theory) of N,N'-bis-(2-hydroxybenzyl)-4,4'-diamino-diphenylmethane with a melting point of 118°–121° C. then crystallise out. The total yield is thus 75.3% of theory.

For analysis, 23.8 g of the first fraction are recrystallised from 150 ml of benzene; yield: 21.2 g; melting point: 125°–126° C.

| Analysis $C_{27}H_{26}N_2O_2$ (molecular weight = 410.52) | | | |
|---|---|---|---|
| calculated | C 79.00 | H 6.38 | N 6.82 |
| found | C 79.01 | H 6.39 | N 6.67 |

The H-NMR spectrum agrees with the above formula.

EXAMPLE 9

(N,N'-Bis-(2-hydroxybenzyl)-4,4'-diamino-diphenylsulphone)

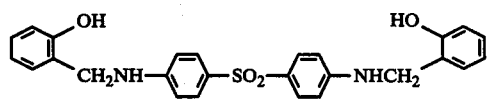

22.8 g of a bisazomethine prepared from 2 mols of salicylaldehyde and 1 mol of 4,4'-diaminodiphenylsulphone and having a melting point of 257°–258° C. are hydrogenated for 2½ hours in 300 ml of dimethylformamide in the presence of 3 g of Raney nickel at 110° C. in an autoclave under a pressure of 60 atmospheres until constant pressure is reached. The catalyst is filtered off and the filtrate is concentrated in a rotary evaporator, leaving as residue a viscous mass, which is then dissolved in a mixture of xylene and isopropanol. Concentration of this solution gives 37 g of a crystalline colourless residue, which is recrystallised from 200 ml of ethanol, yielding 20.1 g of a first fraction with a melting point of 128°–129° C. and 3.6 g of a second fraction with a melting point of 125°–128° C. Per mol, the product contains one mol of dimethylformamide, which is incorporated in the crystal.

The yield is thus 23.7 g (88.7% of theory). For analysis, 11.3 g are recrystallised from 350 ml of ethyl acetate. Yield: 6.7 g; melting point: 131°–132° C. A further recrystallisation and drying for 15 hours at 80° C. and under 0.1 mm Hg gives a product with a melting point of 131°–132° C.

| Analysis C₂₆H₂₄N₂O₄S × C₃H₇NO (molecular weight = 533.64) | | | |
|---|---|---|---|
| calculated | C 65.27 | H 5.86 | N 7.88 |
| found | C 64.97 | H 5.88 | N 7.94 |

The H-NMR spectrum agrees with the above structural formula.

EXAMPLE 10

(N,N'-Bis-(2-hydroxybenzyl)-3-aminomethyl-3,5,5-trimethylcyclohexylamine)

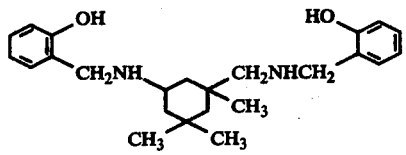

37.8 g of a bisazomethine prepared from 2 mols of salicylaldehyde and 1 mol of 3-aminomethyl-3,5,5-trimethylcyclohexylamine and with a melting point of 132°–133° C. are hydrogenated in 200 ml of glacial acetic acid with 0.5 g of 10% platinum-on-charcoal at room temperature in a hydrogenation flask. The uptake of H₂ ceases after 24 hours. The catalyst is filtered off, the filtrate is concentrated in a rotary evaporator and the residue is dissolved in 150 ml of warm water. After adding 100 ml of chloroform, the mixture is neutralised, with stirring, with aqueous NaOH to pH 9.4 using an electrode. The organic phase is separated off, the H₂O phase is washed with 30 ml of CHCl₃ and the combined organic phases are again extracted by shaking with 25 ml of H₂O. The chloroform is removed in a rotary evaporator, leaving a viscous oily residue which dissolves at 60° C. in 400 ml of cyclohexane. On cooling, N,N'-bis-(2-hydroxybenzyl)-3-aminomethyl-3,5,5-trimethyl-cyclohexylamine crystallises out. The crystalline solid is collected by filtration, washed and dried, affording 29.9 g (78.3% of theory); melting point 101°–104° C. The substance (21.9 g) is again recrystallised from 200 ml of cyclohexane, yielding 19.1 g of a product with a melting point of 105°–106° C.

| Analysis C₂₄H₃₄N₂O₂ (molecular weight = 382.55) | | | |
|---|---|---|---|
| calculated | C 75.35 | H 8.96 | N 7.32 |
| found | C 75.28 | H 9.15 | N 7.35 |

EXAMPLE 11

(N,N'-Bis-(2-hydroxybenzyl)-p,p'-diamino-diphenyl ether)

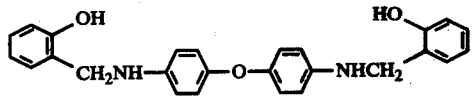

102 g of a bisazomethine prepared from salicylaldehyde and p,p'-diamino-diphenyl ether and with a melting point of 207°–208° C. are hydrogenated for 7 hours in an autoclave in 500 ml of dioxane in the presence of 13 g of Raney nickel at 75° C. and under an initial pressure of 70 atmospheres. Constant pressure is reached after only 2 hours. The catalyst is filtered off, the dioxane is removed in a rotary evaporator and the residue is recrystallised from 600 ml of ethyl acetate. Yield: 50.5 g (49.0% of theory); melting point: 153°–154° C. The mother liquor is concentrated and the residue is recrystallised from 200 ml of butyl acetate; yield: 14.6 g (14.2%); melting point: 150°–151° C. Concentration of the mother liquor gives two further fractions: 6.9 g (6.7% of theory) of a product with a melting point of 147°–149° C. and 2.3 (2.2% of theory) of a product with a melting point of 139°–143° C. A further recrystallisation of the last three fractions from 180 ml of butyl acetate gives 17.4 g (16.9% of theory) of a product with a melting point of 151°–153° C., so that the total yield of N,N-bis-(2-hydroxybenzyl)-p,p'-diamino-diphenyl ether is 65.9% of theory. The NMR spectrum agrees with the above structure.

| Analysis C₂₆H₂₄N₂O₂ (molecular weight = 396.49) | |
|---|---|
| calculated | N 7.07 |
| found | N 6.94 |

EXAMPLE 12

(N,N'-Bis-(2-hydroxy-3,5-dimethylbenzyl)-1,6-diaminohexane)

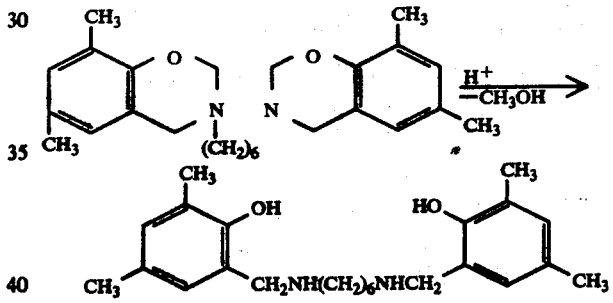

(a) Precursor:
1,6-di-(3,4-dihydro-6,8-dimethyl-1,3,2H-benzoxazin-3-yl)-hexane

A solution of 0.5 g of NaOH in 3 ml of H₂O is added to 36.0 g of paraformaldehyde in 150 ml of methanol at 25° C.; the p-formaldehyde dissolves rapidly. A solution of 29.0 g of 1,6-diaminohexane in 240 ml of methanol is then added dropwise, while keeping the temperature below 30° C. 61.0 g of 2,4-dimethylphenol (purity: 90%; contains isomers) are then added in a single portion and the mixture is refluxed for 6 hours. During this time two liquid phases form and on cooling, with stirring, the product solidifies. The solid is collected by filtration, washed with methanol and dried at 60° C. in vacuo, affording 62.1 g (60.7% of theory) of crude product with a melting point of 98°–104° C. The mother liquor is concentrated and the oily residue is refluxed with 120 ml of acetonitrile for 2 hours. Two liquid phases form from the clear hot solution on cooling and the lower of these phases solidifies on standing overnight. The product is ground and again stirred well with the liquid phase, then filtered off, washed with acetonitrile and dried at 60° C. in vacuo. Yield: 13.6 og of product with a melting point of 96°–103° C. Total yield: 75.7 g (74.0% of theory). A sample recrystallised from methyl ethyl ketone melts at 103°–106° C.; the NMR spectrum agrees with the above structure.

(b) Conversion to the dihydroxy compound 54.8 g of the precursor are refluxed with 150 ml of methanol, 50 ml of H₂O and 27 ml of 37% strength hydrochloric acid in a packed column with a column head. Initially, a boiling point of 43° C. is reached, which corresponds to that of formaldehyde dimethyl acetal. The mixture is slowly distilled off and the boiling point gradually rises to that of methanol (65° C.). When 90 g of the mixture have distilled off, 50 ml of H₂O are added to the distillation residue and distillation is continued until only a small amount of methanol still distils over at a boiling point of 90° C. A further 65 ml of H₂O are then added to the distillation residue and the mixture is allowed to cool. The dihydrochloride of N,N'-bis-(2-hydroxy-3,5-dimethylbenzyl)-1,6-diaminohexane crystallises out from the clear solution with 1 mol of water of crystallisation. The mixture is cooled in a refrigerator and the product is collected by filtration, washed with H₂O and dried at 80° C. in vacuo. Yield: 47.8 g (75.2% of theory). Melting point: the main fraction melts incompletely at between 81° and 83° C., becomes solid again at 90° and has a second melting point at 209°–212° C.

Analysis: $C_{24}H_{36}N_2O_2 \times 2\ HCl \times 1\ H_2O$ (molecular weight = 475.50)

| | | | | |
|---|---|---|---|---|
| calculated | C 60.62 | H 8.48 | N 5.89 | H₂O 3.79 |
| found | C 60.71 | H 8.38 | N 5.94 | H₂O 3.93 |

The NMR spectrum agrees with the above structure.

Free Base 40 ml of H₂O and 150 ml of chloroform are added to 66.7 g of the dihydrochloride x H₂O in a glass beaker. About 50 ml of a 20% aqueous solution of NaOH are added and the thick slurry is stirred with a glass rod. The bulk of the solid product then goes into solution. The pH of the mixture is now brought to 9.5 by adding NaOH solution slowly dropwise, with magnetic stirring and using a pH electrode; all of the solid product dissolves and two liquid phases form. These phases are separated in a separating funnel, the H₂O phase is extracted by shaking with 30 ml of CHCl₃ and the organic phases are washed with 50 ml of H₂O. The CHCl₃ is then removed in a rotary evaporator and the residue is recrystallised from 300 ml of isopropanol. The mixture is cooled overnight in a refrigerator and the product is filtered off, washed with isopropanol and then with n-hexane and dried at 50° C. in vacuo. Yield: 51.4 g (95.5% of theory, based on the dihydrochloride) of N,N'-bis-(2-hydroxy-3,5-dimethylbenzyl)-1,6-diaminohexane with a melting point of 93°–95° C. A further 1.5 g (2.7% of theory) of product with a melting point of 91°–93° C. can be isolated by concentrating the filtrate. The NMR spectrum agrees with the structure indicated above.

EXAMPLE 13

(N,N'-Bis-(4-hydroxybenzyl)-1,2-diaminoethane)

24.16 g of a bisazomethine prepared from 2 mols of p-hydroxybenzaldehyde and 1 mol of ethylenediamine and with a melting point of 215°–216° C. (decomposition) are hydrogenated in 150 ml of glacial acetic acid with 0.5 g of 10% platinum/charcoal at 25° C. in a hydrogenation flask. After 24 hours no further H₂ is taken up. The catalyst is filtered off and the filtrate is concentrated in a rotary evaporator. The residue is crystalline and is stirred with 90 ml of isopropanol at 60° C.; the crystals do not dissolve. They are filtered off at room temperature, washed with isopropanol, and dried at 80° C. in vacuo. Yield 30.65 g (86.8% of theory) of the diacetate of N,N'-bis-(4-hydroxybenzyl)-1,2-diaminoethan with a melting point of 152°–155° C. The NMR spectrum confirms the structure of the diacetate.

Free Base

The above diacetate is dissolved in 200 ml of H₂O at 80° C. and, with stirring, the pH is slowly brought to 9.2 with NaOH. During this process the free amine crystallises out from the hot solution, and is filtered off cold, washed with H₂O and dried at 70° C. in vacuo. Yield: 20.43 g (83.5% of theory, based on the bisazomethine) of product with a melting point of 151°–153° C. For purification, 0.45 g of the free base is recrystallised from 23 ml of ethanol, yielding 0.35 g of product with a melting point of 153°–155° C. The NMR spectrum confirms the structure of the free base (no signals for CH₃CO).

Analysis: $C_{16}H_{20}N_2O_2$ (molecular weight = 272.35)

| | | | |
|---|---|---|---|
| calculated: | C 70.56 | H 7.40 | N 10.29 |
| found: | C 70.23 | H 7.46 | N 10.38 |

EXAMPLE 14

(N,N'-Bis-(4-hydroxybenzyl)-1,6-diaminohexane)

32.40 g of a bisazomethine prepared from 2 mols of p-hydroxybenzaldehyde and 1 mol of 1,6-diaminohexane and with a melting point of 186°–187° C. are hydrogenated in 150 ml of glacial acetic acid in the presence of 0.50 g of 10% platinum/charcoal at 33° C. in a hydrogenation flask. The uptake of H₂ ceases after 26 hours. The catalyst is filtered off and the filtrate is concentrated in a rotary evaporator, leaving crystals and liquid constituents as residue. The crystals do not dissolve when 100 ml of isopropanol are added. The crystals are collected by filtration washed with isopropanol and dried at 90° C. in vacuo. Yield: 21.20 g of a product with a melting point of 174°–176° C. The mother liquor is concentrated and the residue is recrystallised from 50 ml of isopropanol with the addition of 10 ml of cyclohexane. A second fraction of 5.85 g of product with a melting point of 168°–171° C. is obtained. A further concentration of the mother liquor and recrystallisation of the residue from 50 ml of acetone and 10 ml of isopropanol yields a further 1.43 g of product with a melting point of 167°–169° C., so that the total yield increases to 28.48 g (63.5% of theory) of the diacetate of N,N'-bis-(4-hydroxybenzyl)-1,6-diaminohexane.

Preparation of the free base 79.3 g of the diacetate are stirred in 280 ml of ethanol at room temperature. 70 ml of 25% aqueous NH₃ solution are added dropwise to the suspension, which gradually dissolves. 280 ml of $H_2O$ are then added slowly dropwise; during the addition, the free base separates out in crystalline form. The mixture is cooled overnight in a refrigerator and the product is collected by filtration, washed with $H_2O$ and dried at 70° C. in vacuo. Yield: 55.9 g (96.3% of theory, based on the diacetate) of product with a melting point of 130°–131° C.

| Analysis: $C_{20}H_{28}N_2O_2$ (molecular weight = 328.46) | | | |
|---|---|---|---|
| calculated: | C 73.14 | H 8.49 | N 8.53 |
| found: | C 72.66 | H 8.95 | N 8.27 |

The NMR spectrum agrees with the above structure.

EXAMPLE 15

(N,N'-Bis-[(2-hydroxynaphth-1-yl)-methyl]-1,6-diaminohexane)

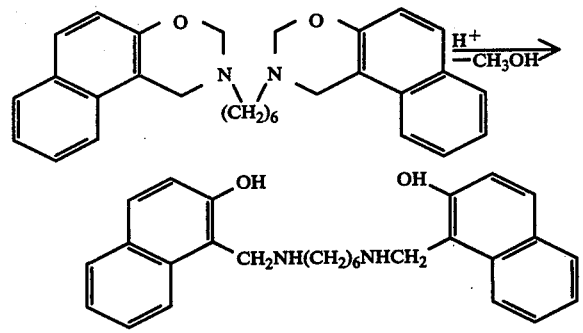

(a) Precursor:
N,N'-bis-(2,3-dihydro-1H-naphth-[1,3-e][1,3]-oxazin-2-yl)-1,6-diaminohexane 36.0 g of paraformaldehyde are dissolved at room temperature in 150 ml of methanol with the addition of 0.5 g of NaOH in 3 ml of $H_2O$. With cooling, a solution of 29.0 g of 1,6-diaminohexane in 70 ml of methanol is added dropwise below 30° C. The mixture is stirred for a further 10 minutes and 72.0 g of β-naphthol are then added in portions. The β-naphthol rapidly dissolves and the crystalline reaction product separates out after 1 minute. When the addition is complete, 100 ml of methanol are added to the thick crystal slurry and the mixture is refluxed for a further 4 hours. After cooling, the product is collected by filtration, washed with methanol and dried at 80° C. in vacuo. Yield: 105.2 g (93% of theory) of product with a melting point of 115°–18° C. A further 1.4 g (1.2% of theory) of product with a melting point of 115°–17° C. are obtained by concentrating the filtrate. 2.00 g are recrystallised from 8 ml of methyl ethyl ketone, yielding 1.71 g of product with a melting point of 116°–18° C. The NMR spectrum agrees with the above structure. The IR spectrum shows no OH or NH bands above 3.000 $cm^{-1}$.

(b) Conversion to the dihydroxy compound 45.2 g of the precursor are boiled with 230 ml of methanol, 130 ml of water and 21.6 g of concentrated $H_2SO_4$; the product dissolves rapidly. The formaldehyde dimethyl acetal (boiling point 43° C.) and a small amount of methanol are distilled off through a column. 100 ml of water and 300 ml of chlorobenzene are added to the distillation residue and, with vigorous stirring, an aqueous NaOH solution is added dropwise at 70° C. until the pH value is 12 (measurement with pH electrode). Two liquid phases form and the pH of these is brought to 9.5 with a small amount of dilute $H_2SO_4$. The two phases are separated at about 60° C. and the organic phase is washed with warm water. On cooling, crystals separate out from the organic solution and after cooling the solution in a refrigerator these crystals are filtered off, washed with ethanol and dried at 75° C. in vacuo. Yield: 17.5 g (40.8% of theory) of N,N'-bis-[(2-hydroxynaphth-1-yl)-methyl]-1,6-diaminohexane having a melting point of 124°–126° C. A further 6.1 g (14.2% of theory) of product having a melting point of 125°–28° C. are obtained by concentrating the mother liquor. After recrystallization from 35 parts of acetonitrile, the pure product melts at 131°–2° C. The NMR spectrum agrees with the above structure.

| Analysis: $C_{28}H_{32}N_2O_2$ (molecular weight = 428.58) | | | |
|---|---|---|---|
| calculated: | C 78.47 | H 7.53 | N 6.54 |
| found: | C 78.48 | H 7.72 | N 6.66 |

EXAMPLE 16

(N,N'-Bis-(2-hydroxy-3,5-dichlorobenzyl)-1,6-diaminohexane)

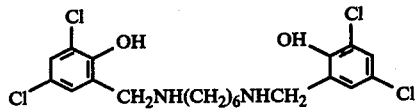

The preparation is carried out by procedures analogous to Preparation Examples 12 and 15, but the intermediate is not isolated.

A solution of 0.2 g of NaOH in 1.5 ml of $H_2O$ is added to 13.2 g of paraformaldehyde in 60 ml of methanol at 25° C.; a clear solution forms. Then 11.6 g of a solution of 1,6-diaminohexane in 30 ml of methanol are added dropwise below 30° C., followed by the dropwise addition of a solution of 32.6 g of 2,4-dichlorophenol in 30 ml of methanol. After refluxing the mixture for 12 hours, two liquid phases are formed. The lower phase is separated off and stirred with 100 ml of methanol and 22 g of 37% aqueous hydrochloric acid are added. The mixture is refluxed for 3 hours and concentrated in a rotary evaporator and the residue is dissolved at 60° C. in 250 ml of $H_2O$. After adding 250 ml of chlorobenzene, the mixture is neutralised to pH 7 with aqueous NaOH at 60° C., with good stirring, and the product precipitates. The precipitate is dissolved by addition of 400 ml of methyl ethyl ketone at 60° C. After separating off the aqueous phase, crystals precipitate from the organic phase on cooling. The yield is 13.6 g (29% of theory) of N,N'-bis-(2-hydroxy-3,5-dichlorobenzyl)-1,6-diaminohexane with a melting point of 154°–162° C. Concentration of the mother liquor gives a further 2.7 g of product with a melting point of 157°–161° C. After recrystallization of the two fractions from 80 ml of dioxane, the yield of pure product, which has a melting point of 160°–162° C., is 13.2 g. The NMR spectrum confirms the above structure.

Analysis: $C_{20}H_{24}N_2O_2Cl_4$ (molecular weight = 466.24).

| | | | |
|---|---|---|---|
| calculated: | C 51.52 | H 5.19 | N 6.01 |
| found: | C 51.44 | H 5.32 | N 5.90 |

EXAMPLE 17

(N,N'-Bis-(2-hydroxy-3,5-di-tert.-butylbenzyl)-1,6-diaminohexane)

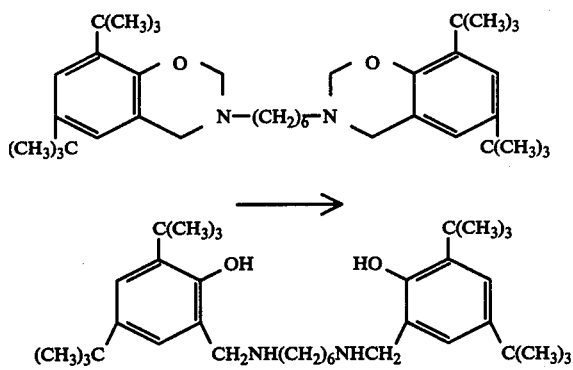

(a) Precursor:
1,6-di-(3,4-dihydro-6,8-di-tert.-butyl-1,3,2H-benzoxazin-3-yl)-hexane 39.6 g of paraformaldehyde are dissolved in 180 ml of methanol at 25° C. with 0.6 g of NaOH in 4.5 ml of $H_2O$. A solution of 34.9 g of 1,6-diaminohexane in 90 ml of methanol is added dropwise below 30° C. and a solution of 124 g of 2,4-di-tert.-butylphenol in 90 ml of methanol is then added dropwise. The mixture is then refluxed for 12 hours and two layers are formed. The upper phase is decanted off and 200 ml of methanol and 60 ml of concentrated aqueous hydrochloric acid are added to the lower phase. A clear solution is formed and the dihydrochloride of the precursor separates. The product is collected by filtration, washed with methanol and dried in vacuo at 80° C. Yield: 88.6 g (45% of theory) of the dihydrochloride and a melting point of 186°-189° C.

(b) Conversion to the dihydroxy compound 83.9 g of the precursor are boiled with 335 ml of methanol for 15 hours in a column with a column head and a total of 170 g of distillate are drawn off very slowly. The distillation residue is concentrated in a rotary evaporator and the product is dissolved in 580 ml of ethanol. On concentrating the solution to about 250 ml, the dihydrochloride of N,N'-bis-(2-hydroxy-3,5-di-tert.-butylbenzyl)-1,6-diaminohexane crystallises out. The product is cooled in a refrigerator, collected by filtration, washed with ethanol and dried at 60° C. in vacuo. Yield: 48.4 g of product with a melting point of 241°-244° C. A further 7.3 g of product with a melting point of 238°-242° C. are obtained by concentrating with mother liquor. After recrystallisation from ethanol with the addition of a small amount of $H_2O$, the product melts at 247°-249° C.

Analysis: $C_{36}H_{60}N_2O_2 \times 2$ HCl (molecular weight = 625.81)
| | | | | |
|---|---|---|---|---|
| calculated: | C 69.09 | H 9.99 | N 4.48 | Cl 11.33 |
| found: | C 69.20 | H 9.99 | N 4.58 | Cl 11.41 |

Free Base 53.4 g of the dihydrochloride obtained above are stirred with 100 ml of $H_2O$ and 500 ml of $CHCl_3$ and the pH of the mixture is brought to 9.5 by adding 10% aqueous sodium hydroxide solution. The $CHCl_3$ phase is separated off in a separating funnel, the aqueous phase is extracted with a further 50 ml of $CHCl_3$ and $CHCl_3$ is removed from the organic solutions. The residue (52 g) is recrystallized from 265 ml of ethanol. Yield: 39.6 g (84% of theory, based on the dihydrochloride) of free base with a melting point of 103°-108° C. After recrystallisation from ethanol, the pure product melts at 112°-113° C.

Analysis: $C_{36}H_{60}N_2O_2$ (molecular weight = 552.88)
| | | | |
|---|---|---|---|
| calculated: | C 78.21 | H 10.94 | N 5.07 |
| found: | C 78.36 | H 11.02 | N 5.11 |

The NMR spectrum agrees with the above structure.

EXAMPLE 18

(N,N'-Bis-(4-hydroxy-3,5-dimethylbenzyl)-2,3-diphenyl-1,4-diaminobutane)

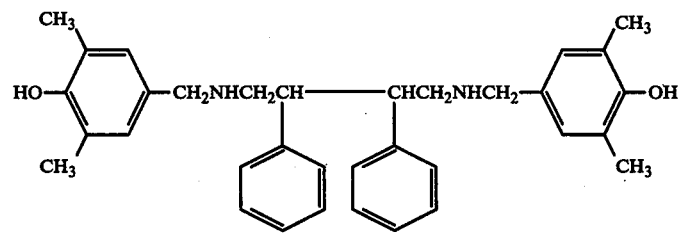

31.3 g of a bisazomethine prepared from 2 mols of 4-hydroxy-3,5-dimethyl-benzaldehyde and 1 mol of 2,3-diphenyl-1,4-diamino-butane and with a melting point of 217°-219° C. are hydrogenated in 250 ml of glacial acetic acid in the presence of 1.0 g of 5% platinum-on-charcoal at 50° C. and under 50 atmospheres in an autoclave. The uptake of $H_2$ has stopped after 15 minutes. The catalyst is filtered off, the filtrate is concentrated in a rotary evaporator and the oily residue is dissolved in 150 ml of isopropanol. The product crystallises from the hot solution. The crystals are collected by filtration at room temperature, washed with isopropanol and dried at 50° C. in vacuo, yielding 37.9 g of the acetate of the amine with a melting point of 174°-177° C.

To prepare the free base, 6.3 g of the acetate are boiled briefly with 0.80 g of NaOH and 120 ml of 50% alcohol and the non-dissolved product is collected by filtration of room temperature, washed with ethanol and dried at 60° C. in vacuo. Yield: 3.7 g of product with a melting point of 201°-203° C.

Analysis: $C_{34}H_{40}N_2O_2$ (molecular weight = 508.71)
calculated:  C 80.28  H 7.93  N 5.51
found:       C 80.07  H 7.96  N 5.65

(B) Use Examples

EXAMPLES I TO XXI 18 mixtures according to the invention are compared with 3 mixtures of the prior art.

The constituents of these mixtures are prepared in the respective amounts indicated in Table 1 at 80° to 120° C. on a three roll mill. The resin component used is a liquid bisphenol A epoxide resin having an epoxide content of 5.3 to 5.4 equivalents/kg and a viscosity of about 10,000 cP at 25° C. The mixture according to Comparison Example XIII contains as the curing agent "curing agent B" of Example 2 of German Auslegeschrift No. 1,618,801, i.e. a condensation product of isophoronediamine, phenol and paraformaldehyde.

EXAMPLES XXII to XXV

Table 4 lists experiments carried out with curable mixtures according to the invention, in which epoxide resins of different structures were employed.

The constituents of the particular mixtures were melted together at 100° C. and as soon as a homogeneous solution was obtained, air which had been stirred in during mixing was removed under vacuum and the mixture was poured into moulds warmed to 100° C.

The epoxide resin employed in Example XXII was a diglycidyl ester of hexahydrophthalic acid having an epoxide content of 6.3 equivalents/kg and a viscosity of 450 cP at 25° C. (epoxide resin B), that employed in Example XXIII was a solid epoxide resin based on bisphenol A and having an epoxide content of 2.4 equivalents/kg and a softening range of about 40° C. (epoxide resin C), that employed in Example XXIV was a diglycidyl compound obtained from 3-(2-hydroxypropyl)-5,5-dimethylhydantoin and having an epoxide content of 6.0 equivalents/kg and a viscosity of 1,300 cP at 25° C. (epoxide resin D) and that employed in Example XXV was a polyglycide of pentaerythritol having an epoxide content of 7.3 equivalents/kg and a viscosity of 400 cP at 25° C. (epoxide resin E).

The following methods are used to determine the reactivity of the mixture and the glass transition temperatures of the cured products obtainable therefrom, which are also illustrated in Table 1.

Determination of the reactivity

Differential thermoanalysis is used to determine the reactivity. About 20 mg of the resin/curing agent mixture to be tested are warmed in a small Al sample pan in the measuring chamber of a type TA 2000 Differential-Thermo-Analyzer of Messrs. Mettler (Greifensee, Switzerland) at a heating rate of 4°/minute and the temperature difference between this sample pan and an empty one warmed at the same time is recorded continuously. From the curve thus obtained, the temperatures for the start of the reaction, for the maximum reaction rate and for the end of the reaction are read off as parameters characterising the reactivity.

Determination of the glass transition temperature (GTT)

4 g of the resin/curing agent mixture are, in each case, poured into a thin-walled Al crucible of about 5 cm diameter and completely cured in this crucible. A sample is taken from the disc thus obtained in order to determine the glass transition temperature of the cross-linked polymer with the aid of differential thermoanalysis. The specific heat changes at the transition point; this change is registered as inflection point in the curve recorded by the DTA apparatus. Conclusions regarding the dimensional stability of the resulting polymer when hot can be drawn from the glass transition temperature.

The following methods are used to determine the mechanical and dielectric properties, which are listed in Table 2.

Determination of the mechanical and dielectric properties of moulding materials Air which has been stirred in during mixing is removed under vacuum from the resin/curing agent mixtures listed in Table 1 and the mixtures are then poured into aluminium moulds, which have been pre-treated with mould release agents, to produce sheets measuring 135 × 135 × 4 mm, 135 × 135 × 3 mm and 135 × 135 × 2 mm, and which are completely cured under the conditions indicated in the Tables.

Test pieces measuring 15 × 10 × 3 mm are sawn from the 3 mm thick sheets to determine the flexural strength, the impact strength and the angle of deflection on the Dynstat apparatus (described by W. Holzmüller/K. Altenberg "Physik der Kunststoffe" ("Physics of Plastics") Akademie-Verleg, Berlin, 1961, pages 597–604). The absorption of $H_2O$ is also determined using the same test pieces.

The 4 mm thick sheets are used to produce test pieces measuring 60 × 10 × 4 mm for determining the flexural strength and deflection according to VSM Standard Specification 77,103, the impact strength according to VSM Standard Specification 77,105 and the increase in weight after storage in water. The 2 mm thick sheets are used to determine the dielectric properties.

The following test methods are used to determine the adhesive properties and the properties in respect of lacquer technology of the mixtures according to the invention and the chemical stability of the cured products. The results are reported in Table 3.

Test to determine the suitability as an adhesive

A small amount of the resin/curing agent mixture is applied to the ends of test strips made of Anticorodal B measuring 170 × 25 × 1.5 mm and which have previously been roughened by grinding and degreased by washing with solvent. In each case, the ends of two test strips coated with resin/curing agent mixture are adjusted with a gange to overlap by 12 mm. After fixing with a clamp, the adhesive is cured and after cooling the clamp is removed and the tensile shear strength of the adhesive bond is then tested in a tensile test (DIN 53,183).

Test to determine the properties in respect of lacquer technology

The resin/curing agent mixture is applied without the addition of a solvent in a layer of 50 μm to an iron sheet measuring 350 × 70 × 0.8 mm which has been degreased by washing with trichloroethylene. The film is then cured in an oven.

After the film has cooled, it is tested to determine the Erichsen deep drawing according to DIN 53,156, the impact drawing — also known as the impact test — and the deformability in the mandrel forming test.

Test to determine the chemical stability

After it has been completely cured, a film applied to a degreased glass plate is tested in the following way to determine its chemical stability: one drop of the particular chemicals is left on the film for 1 hour. The chemicals are then wiped off and the surface of the film is assessed visually.

The determination of the suitability of the mixtures according to the invention for the production of B-stages, which is illustrated in Table 5, is carried out as described below.

Test to determine the suitability for the production of pre-reaction products which are still fusible and are stable on storage (B-stages)

To produce B-stages, the respective solid amine is dissolved at 80°–120° C., depending on the solubility of the amine, in the epoxide resin, and the solution is then cooled to room temperature in order to stop the amine/epoxide reaction. Semi-solid to solid compositions are obtained which are still fusible and which, after melting and curing, give properties which are the same as those obtained when the resin and curing agent are poured into moulds directly under mixing and immediately cured at elevated temperature.

The pre-reaction products produced in this way are stored in tins at room temperature and their reactivity and their softening range are checked at specific intervals. Two different experimental methods are used for this purpose:

(a) Determination of the reactivity using the Mettler TA 2000 Differential Thermoanalyzer.

In addition to changes in the temperatures for the start of reaction and the reaction maximum, the determination of the heat of reaction further liberated during curing of the pre-reaction products in particular makes it possible to assess the degree of conversion before and after storage of the pre-reaction product. A comparison with the "enthalpy of the particular system with no storage", which is also indicated in Table 4, is particularly interesting.

(b) Determination of the softening range using a Kofler heated bench, supplemented by determination of the gel time on thermostatically controlled hot-plates which are regulated to 120° C. and 140° C.

For further characterisation of the B-stages, the tensile shear strength according to DIN 53,183 when the particular B-stages are used are also determined.

Table 1

| Example | | I | II | III | IV | V | VI | VII | VIII |
|---|---|---|---|---|---|---|---|---|---|
| (Reactivity test and test for determining the glass transition temperature) | | | | | | | | | |
| Curing agent | according to Example | 1 | 4 | 5 | 2 | 3 | 6 | 8 | 10 |
| | Amount [parts by weight] per 100 parts by weight of epoxide resin | 36.7 | 37.9 | 48.1 | 44.3 | 55.6 | 47 | 55.4 | 51.6 |
| Thermal analysis on TA 2000 | | | | | | | | | |
| $T_S$ | (° C) | 82 | 77 | ~100 | ~85 | ~80 | 47 | 70 | 75 |
| $T_{RRmax}$ | (° C) | 118+ 187 | 120+ 181 | 169+ 323 | 121+ 181 | 128+ 187 | 121+ 202 | 109+ 175 | 144+ 188 |
| $T_E$ | (° C) | 253 | 256 | 349 | 253 | 251 | 254 | 254 | 260 |
| Curing | | 4 hours 100° C+ 8 hours 140° C | 4 hours 80° C+ 8 hours 140° C | 4 hours 100° C+ 8 hours 140° C | 4 hours 100° C+ 6 hours 140° C | 4 hours 100° C+ 8 hours 140° C | 6 hours 100° C+ 6 hours 180° C | 6 hours 100° C+ 6 hours 180° C | 4 hours 100° C+ 8 hours 140° C |
| Glass transition temperature (° C) | | 117 | 113 | 123 | 107 | 90 | 118 | 155 | 126 |

| Example | | IX | X | XI | XII | XIII (Comparison) | XIV (Comparison) | XV (Comparison) |
|---|---|---|---|---|---|---|---|---|
| Curing agent | according to Example | 11 | 12 | 13 | 14 | German Auslegechrifts Example 2* | 4,4-DADPM | 4,4'-DA-3,3'-DM |
| | Amount [parts by weight] per 100 parts by weight of epoxide resin | 55.6 | 51.8 | 36.7 | 44.3 | 40 | 26.2 | 31.5 |
| Thermal analysis on TA 2000 | | | | | | | | |
| $T_S$ | (° C) | 86 | 88 | 79 | 62 | 33 | 60 | 37 |
| $T_{RRmax}$ | (° C) | 118+ 183 | 145+ 212 | 116+ 139 | 105° C 135 | 83+ 196 | 138 | 105 |
| $T_E$ | (° C) | 254 | 288 | 238 | 171 | 263 | 220 | 199 |
| Curing | | 6 hours 120° C | 4 hours 180° C+ 6 hours 140° C | 8 hours 140° C | 6 hours 140° C | 24 hours 140° C+ 6 hours 100° C | 4 hours 80° C+ 8 hours 140° C | 4 hours 80° C+ 8 hours 140° C |
| Glass transition temperature (° C) | | 128 | 95 | 119 | 105 | 90 | 161 | 170 |

| Example | | XVI | XVII | XVIII | XIX | XX | XXI |
|---|---|---|---|---|---|---|---|
| Curing agent | according to Example | 11 | 12 | 16 | 15 | 13 | 14 |
| | Amount [parts by weight] per | | | | | | |

Table 1-continued
(Reactivity test and test for determining the glass transition temperature)

| | | | | | | | |
|---|---|---|---|---|---|---|---|
| | 100 parts by weight of epoxide resin | 55.6 | 51.8 | 62.9 | 57.8 | 36.7 | 44.3 |
| Thermal analysis on TA 2000 | | | | | | | |
| $T_S$ | (° C) | 86 | 88 | 86 | 76 | 79 | 62 |
| $T_{RRmax}$ | (° C) | 118 + 183 | 145 + 212 | 131 | 109 + 202 | 116 + 139 | 105 + 135 |
| $T_E$ | (° C) | 254 | 288 | 240 | 255 | 238 | 170 |
| Curing | | 6 hours 120° C | 4 hours 100° + 6 hours 140° C | 8 hours 140° C | 4 hours 100° + 8 hours 140° C | 8 hours 140° C | 6 hours 140° C |
| Glass transition temperature (° C) | | 91 | 105 | 107 | 119 | 105 | |

Explanation of the symbols:
4,4'-DADPB = 4,4'-diamino-diphenylmethane
4,4'DA-3,3'-DM = 4,4'-diamino-3,3'dimethyl-dicyclohexylmethane
$T_S$ = temperature at the start of the reaction
$T_{RRmax}$ = temperature at the maximum rate of reaction
$T_E$ = temperture at the end of the reaction
*condensation product of isophoronediamine, phenol and paraformaldehyde

Table 2
(Mechanical and dielectric properties)

| Example | I | II | III | VI | VII | VIII |
|---|---|---|---|---|---|---|
| Curing | 4 hours 100° C+ 8 hours 140° C | 4 hours 80° C+ 8 hours 140° C | 4 hours 100° C+ 6 hours 140° C | 6 hours 100° C+ 180° C | 6 hours 100° C+ 6 hours 180° C | 4 hours 100° C+ 8 hours 140° C |
| Impact strength VSM (cmkg/cm$^2$) Dynstat (cmkg/cm$^2$) | 25 | 25.0 | 27.0 | 11.0 | 18.3 | 10 |
| Flexural strength VSM (kg/mm$^2$) Dynstat (kg/cm$^2$) | 12.8 | 13.4 | 12.4/10.2* | 1,370 | 13.4 | 8.2 |
| Deflection VSM (mm) Angle of deflection Dynstat (>° C) | 9.2 | 12.0 | 8.5/13.1* | | 5.5 | 3.4 |
| Uptake of H$_2$O after 4 days at room temperature (%) | 0.16 | 0.2 | 0.23 | 0.27 | 0.28 | 0.21 |
| Uptake of H$_2$O after 1 hour in boiling water (%) | 0.20 | 0.24 | 0.32 | 0.52 | 0.28 | 0.24 |
| Loss factor tan δ >1% above >5% above | 100° C 118° C | 97° C 117° C | 86° C 101° C | 100° C 117° C | 146° C 163° C | 116° C 127° C |
| Dielectric constant ε at 25° C | 4.0 | 3.9 | 3.9 | 3.9 | 3.7 | 4.0 |
| Specific volume resistivity at 25° C (Ω cm) | 4.10$^{16}$ | 3.1.10$^{16}$ | 7.10$^{16}$ | 3.7.10$^{16}$ | 2.4.10$^{16}$ | 7.10$^{17}$ |

| Example | IX | X | XI | XII | XIII | XIV | XV |
|---|---|---|---|---|---|---|---|
| Curing | 6 hours 120° C | 6 hours 100° C+ 140° C | 8 hours 140° C | 6 hours 140° C | 24 hours 40° C+ 6 hours 100° C | 4 hours 80° C+ 8 hours 140° C | 4 hours 80° C+ 8 hours 140° C |
| Impact strength VSM (cmkg/cm$^2$) Dynstat (cmkg/cm$^2$) | 14.5 | 18.5 | 7.4 | 4:8 | 6.0 | 36 13.2 | 21.3 17.2 |
| Flexural strength VSM (kg/mm$^2$) Dynstat (kg/cm$^2$) | 13.1 | 11.8 | 9.2 | 6.6 | 9.6 | 13.7 1,435 | 13.2 1,625 |
| Deflection VSM (mm) Angle of deflection Dynstat (>° C) | 11.2 | 10.8 | 5.0 | 3.6 | 3 | 13.9 52 | 10 54 |
| Absorption of H$_2$O after 4 days at room temperaure (%) | 0.26 | 0.13 | 0.26 | 0.27 | 0.2 | 0.3 | 0.3 |
| Absorption of H$_2$O after 1 hour in boiling water (%) | 0.20 | 0.33 | 0.46 | 0.52 | 0.34 | 0.2 | 0.35 |
| Loss factor tan δ >1% above >5% above | — — | — — | 60° C 102° C | 71° C 87° C | not tested since it was not possible to produce any 2 mm thick mouldings | 151° C 187° C | 152° C 171° C |
| Dielectric constant ε at 25° C | — | — | 4.1 | 4.6 | | 4.7 | 4.1 |
| Specific volume resistivity at 25° C (Ω cm) | — | — | 3.9.10$^{15}$ | 2.10$^{16}$ | | 1.5.10$^{16}$ | 3.10$^{16}$ |

*two values measurable
1. under maximum load
2. at break

| Example | XVI | XVII | XX | XXI |
|---|---|---|---|---|
| Curing | 6 hours 120° C | 4 hours 100° C+ 6 hours 140° C | 8 hours 140° C | 6 hours 140° C |
| Impact strength VSM (cmkg/cm$^2$) | 14.5 | 18.5 | 7.4 | 4.8 |
| Flexural strength VSM (kg/mm$^2$) | 12.9 | 11.6 | 9.0 | 6.5 |
| Deflection VSM (mm) | 11.2 | 10.8 | 5.0 | 3.6 |

Table 2-continued

| (Mechanical and dielectric properties) | | | | |
|---|---|---|---|---|
| Absorption of $H_2O$ after 4 days at room temperature (%) | 0.26 | 0.13 | 0.26 | 0.27 |
| Absorption of $H_2O$ after 1 hour in boiling water (%) | 0.20 | 0.33 | 0.46 | 0.52 |
| Dielectric constant ε at 25° C | — | — | 4.1 | 4.6 |
| Specific volume resistivity at 25° C (Ω cm) | — | — | $3.9.10^{16}$ | $1.3.10^{16}$ |

Table 3

(Adhesion, properties in respect of lacquer technology and chemical stability)

| Example | I | II | III | IV | V | VI | VII |
|---|---|---|---|---|---|---|---|
| Curing | 4 hours 100° C + 8 hours 140° C | 4 hours 80° C + 8 hours 140° C | 4 hours 100° C + 8 hours 140° C | 4 hours 100° C + 6 hours 140° C | 4 hours 100° C + 8 hours 140° C | 6 hours 100° C + 6 hours 180° C | 6 hours 100° C + 6 hours 180° C |
| Tensile shear strength (N/mm²) | 13.5 | 19.5 | 16.0 | 18 | 13.5 | 17.5 | — |
| Erichsen deep-drawing (mm) | 5.5 | 7.2 | 4.9 | 5.9 | 8.1 | 0.7 | 0.5 |
| Impact test (cm/kg hammer) | 50/1 | 90/2 | 30/1 | 50/1 | 60/2 | <10/1 | <10/1 |
| Mandrel forming, mandrel size 15 mm (>° C) | 180 | 180 | 180 | 180 | 180 | 20 | <10 |
| Chemical stability | | | | | | | |
| 5 N $H_2SO_4$ | 1 | 1 | 1 | 1 | 1 | 1 | 1 |
| 5 N NaOH | 1 | 1 | 1 | 1 | 1 | 1 | 1 |
| $H_2O$ | 1 | 1 | 1 | 1 | 1 | 1 | 1 |
| acetone | 2 | 1 | 2 | 2 | 2 | 3 | 2 |
| Cl-benzene | 1 | 1 | 2 | 2 | 2 | 2 | 1 |

| Example | VIII | IX | X | XI | XII | XIII | XIV | XV |
|---|---|---|---|---|---|---|---|---|
| Curing | 4 hours 100° C + 8 hours 140° C | 6 hours 120° C | 4 hours 100° C + 6 hours 140° C | 8 hours 140° C | 6 hours 140° C + 6 hours 100° C | 24 hours 40° C + 8 hours 140° C | 4 hours 80° C + 8 hours 140° C | 4 hours 80° C + 8 hours 140° C |
| Tensile shear strength (N/mm²) | 16 | 8.9 | 17.1 | 18 | 16 | 7.5 | 5.0 | 8.0 |
| Erichsen deep-drawing (mm) | 4.7 | — | — | 5.0 | 2.7 | — | 3.4 | 5.3 |
| Impact test (cm/kg hammer) | 20/1 | — | — | 10/1 | 100/2 | — | 50/1 | 50/1 |
| Mandrel forming mandrel size 15 mm (>° C) | 180 | — | — | 180 | 180 | — | 180 | 180 |
| Chemical stability | | | | | | | | |
| 5 N $H_2SO_4$ | 1 | 1 | 1 | 1 | 1 | 1 | 1 | 1 |
| 5 N NaOH | 1 | 1 | 1 | 1 | 1 | 1 | 1 | 1 |
| $H_2O$ | 1 | 1 | 1 | 1 | 1 | 1 | 1 | 1 |
| acetone | 2 | 1 | 1 | 1 | 2 | 3 | 1 | 1 |
| Cl-benzene | 1 | 1 | 1 | 1 | 2 | 3 | 1 | 1 |

| Example | XVI | XVII | XVIII | XIX | XX | XXI |
|---|---|---|---|---|---|---|
| Curing | 6 hours 120° C | 4 hours 100° C + 6 hours 140° C | 8 hours 140° C | 4 hours 100° C + 8 hours 140° C | 8 hours 140° C | 6 hours 140° C |
| Tensile shear strength (N/mm²) | 8.9 | 17.1 | 17.3 | 17.7 | 18 | 16.2 |
| Erichsen deep-drawing (mm) | — | — | — | — | 5.0 | 2.7 |
| Impact test (cm/kg hammer) | — | — | — | — | 100/1 | 100/2 |
| Mandrel forming; mendrel size 15 mm (>° C) | — | — | — | — | 180 | 180 |
| Chemical stability | | | | | | |
| 5 N $H_2SO_4$ | 1 | 1 | 1 | 1 | 1 | 1 |
| 5 N NaOH | 1 | 1 | 1 | 1 | 1 | 1 |
| $H_2O$ | 1 | 1 | 1 | 1 | 1 | 1 |
| acetone | 1 | 1 | 2 | 1 | 1 | 2 |
| Cl-benzene | 1 | 1 | 1 | 1 | 1 | 2 |

Explanation of the symbols used for rating:
1 = no attack discernible
2 = slight attack on the surface of the film discernible
3 = extensive attack on the film discernible
4 = film completely destroyed

Table 4

(Properties after curing of epoxide resins of different structures)

| Example | XXII | XXIII | XXIV | XXV |
|---|---|---|---|---|
| Epoxide resin used | B | C | D | E |
| Curing agent according to Example | 2 | 2 | 3 | 8 |
| Amount (parts by weight) per 100 parts by weight of epoxide resin | 51.7 | 19.7 | 61.8 | 74.8 |
| Curing | 4 hours 100° C + 6 hours 140° C | | | |
| Impact strength according to VSM (cmkg/cm²) | 23.2 | 78 | 22.6 | 15.7 |
| Flexural strength according to VSM (kg/mm²) | 12.2 | 11.6 | 8.7 | 13.8 |
| Deflection according to VSM (mm) | 6.4 | 13.2 | 7.5 | 7.2 |
| Absorption of $H_2O$ after 4 days at room temperature (%) | 0.39 | 0.23 | 1.8 | 0.32 |
| Absorption of $H_2O$ after 1 hour in boiling water (%) | 1.2 | 0.53 | 2.2 | 0.62 |
| Tensile shear strength (N/mm²) | 16 | 20.5 | 7 | 10.2 |

Table 5 (B-stages)

| System, Example | I | | | II | | | III | | | VI | | | VII | | |
|---|---|---|---|---|---|---|---|---|---|---|---|---|---|---|---|
| Preparation of the B-stage | Amine dissolved in the resin at 110° C, solution then immediately cooled to room temperature | | | Amine dissolved in the resin at 90° C, solution then immediately cooled to room temperature | | | Amine dissolved in the resin at 110° C, solution then immediately cooled to room temperature | | | Amine dissolved in the resin at 80° C, solution then immediately cooled to room temperature | | | Amine dissolved in the resin at 120° C, solution then immediately cooled to room temperature | | |
| Storage time at room temperature (days) | 1 | 60 | 90 | 0 | 60 | 90 | 0 | 60 | 90 | 0 | 60 | 90 | 0 | 60 | 90 |
| Measurement on TA 2000 | | | | | | | | | | | | | | | |
| Melting point (° C) | 36 | 44 | 47 | 38 | 45 | 46 | — | — | — | — | 50 | 50 | — | 55 | 55 |
| $T_S$ (° C) | 58 | 67 | 67 | 88 | 99 | 99 | 100 | 92 | 94 | 50 | 70 | 71 | 44 | 66 | 67 |
| $T_{RRmax}$ (° C) | 108/192 | 188 | 183 | 184 | 187 | 188 | 168 | 155 | 155 | 117/204 | 204 | 204 | 97/175 | 175 | 175 |
| Enthalpy (cal/equivalent) | 13,875 | 11,750 | 11,020 | 11,785 | 10,145 | 9,390 | 30,160 | 27,225 | 23,910 | 20,970 | 17,020 | 13,230 | 16,140 | 14,010 | 14,920 |
| Conversion effected (%) | 46.2 | 54.4 | 57.2 | 56.8 | 62.8 | 65.6 | 1.6 | 11 | 21.8 | 35.6 | 47.7 | 47.0 | 22.7 | 33 | 28.5 |
| Enthalpy of the system with no storage | 25,775 | | | 27,265 | | | 30,570 | | | 32,580 | | | 20,890 | | |
| Measurements on a Kofler bench or B-time plate | | | | | | | | | | | | | | | |
| Softening point (° C) | 54 | 68 | 68 | 62 | 64 | 64 | 45' | semi-<50° C | solid | 60 | 68 | semi-68 | solid | 68 | 72 |
| Gel time at 120° C | 55' | 24' | 24' | 24' | 20' | 14' | 30' | 32' | 29' | >45' | >45' | >45' | >45' | 42' | 42' |
| Gel time at 140° C | 28' | 13' | 12'30" | 8' | 4'30" | | 13' | 12' | >45' | >45' | >45' | >45' | 17' | 16' | 16' |
| Shear tensile strength (N/mm²) after curing the B-stage for 8 hours at 140° C | 13.8 | 14 | — | — | — | 12.5 | 13.5 | 11 | 19.5 | 19.5 | 19.5 | 10.8 | 11.8 | 9.5 |

| System, Example | VIII | | | IX | | | X | | | XI | | |
|---|---|---|---|---|---|---|---|---|---|---|---|---|
| Preparation of the B-stage | Amine dissolved in the resin at 90° C, solution then immediately cooled to room temperature | | | Amine dissolved in the epoxide resin at 120° C, solution then immediately cooled to room temperature | | | Amine dissolved in the resin at 100° C, solution then immediately cooled to room temperature | | | Amine homogenised by means of a multi-roll mill | | |
| Storage time at room temperature (days) | 0 | 60 | 90 | 3 | 30 | 60 | 5 | 10 | 30 | 3 | 60 | 90 |
| Measurement on TA 2000 | | | | | | | | | | | | |
| Melting point (° C) | — | 51 | 52 | 47 | 52 | 54 | — | — | 36 | — | — | — |
| $T_S$ (° C) | 67 | 67 | 67 | 66 | 67 | 66 | 67 | 52 | 60 | 79 | 79 | 79 |
| $T_{RRmax}$ (° C) | 142/183 | 192 | 193 | 181/327 | 183/329 | 183/321 | 127/214 | 116/207 | 216 | 116/138 | 112/137 | 120/136 |
| Enthalpy (cal/equivalent) | 25,490 | 14,870 | 14,505 | 20,000 | 19,900 | 19,080 | 11,600 | 11,000 | 9,530 | 18,500 | 15,280 | 13,340 |
| Conversion effected (%) | 4.8 | 54.5 | 55.8 | 5.8 | 6.3 | 10.8 | 52.7 | 55.2 | 61.2 | 0 | 17.4 | 27.9 |
| Enthalpy of the system with no storage | 26,780 | | | 21,240 | | | 24,500 | | | 18,500 | | |
| Measurements on a | | | | | | | | | | | | |

Table 5-continued (B-stages)

| Kofler bench or | B-time plate | | | | | | | | | | |
|---|---|---|---|---|---|---|---|---|---|---|---|
| Softening point (° C) | | 66 | 68 | 72 | 74 | 76 | ~room temperature | 52 | 54 | | viscous suspension |
| Gel time at 120° C | >45' | >45' | >45' | 50' | 50' | 50' | 2 hours | 2 hours | 2 hours | 8' | 7'45" |
| Gel time at 140° C | >45' | >45' | >45' | 16' | 16' | 16' | 1 hour 10' | 1 hour 10' | 1 hour 10' | 2'15" | 1'40" |
| Shear tensile strength (N/mm²) after curing the B-stage for 8 hours at 140° C | 15.7 | 11.8 | 11.8 | 12.6 | 11.4 | 12.0 | 17.0 | 17.9 | 20.0 | 17.6 | 20.6 | 18.6 |

| System, Example | XIV (Comparison) | XV (Comparison) | XVI | XVII |
|---|---|---|---|---|
| Preparation of the B-stage | Amine dissolved in the resin at 80° C, solution then cooled to room temperature | 24 hours at room temperature | Amine dissolved in the resin at 120° C, solution then cooled to room temperature | Amine dissolved in the resin at 100° C, solution then cooled to room temperature |

| Storage time at room temperature (days) | 1 | 60 | 90 | 1 | 60 | 90 | 0 | 60 | 90 | 0 | 30 | 60 |
|---|---|---|---|---|---|---|---|---|---|---|---|---|
| Measurement on TA 2000 | | | | | | | | | | | | |
| Melting point (° C) | 39 | 58 | 59 | 42 | 59 | 60 | ~40 | 4 | 4 | — | 36 | 60 |
| $T_S$ (° C) | 51 | 68 | 72 | 55 | 68 | 68 | 40 | 66 | 66 | 67 | 60 | 61 |
| $T_{RRmax}$ (° C) | 124 | 127 | 126 | 114 | 112 | 114 | 95/182 | 183 | 182 | 144/212 | 216 | 214 |
| Enthalpy (cal/equivalent) | 9,980 | 6,195 | 6,195 | 7,695 | 4,715 | 4,470 | 1,600 | 14,500 | 14,500 | 1,900 | 12,400 | 12,500 |
| Conversion effected (%) | 58.5 | 74.3 | 74.3 | 65 | 78.5 | 79.6 | 24.7 | 31.7 | 31.3 | 9.5 | 41 | 40.5 |
| Enthalpy of the system with no storage | 24,050 | | | 21,960 | | | 21,240 | | | 21,000 | | |
| Measurements on a Kofler bench or B-time plate | | | | | | | | | | | | |
| Softening point ° C | 72 | * | * | 72 | * | * | 74 | 74 | 74 | liquid | 54 | 58 |
| Gel time at 120° C | 2'50" | * | * | 1'40" | * | * | 50' | 50' | 48' | | 3 hours | 3 hours |
| Gel time at 140° C | 1'40" | * | * | 1'05" | * | * | 16'20" | 16' | 14'15" | 1 hour 20' | 1 hour 20' | 1 hour 20' |
| Shear tensile strength (N/mm²) after curing | 7 | * | * | 8 | * | * | 11.5 | 12.0 | 10.0 | 16.8 | 20 | 19.6 |

* = can no longer be determined

CONCLUSION

Moulded materials having good mechanical, thermal and dielectric properties can be obtained with N,N'-bis-(2-hydroxybenzyl)-alkylenediamines and N,N'-bis-(2-hydroxybenzyl)arylenediamines in combination with the resins, A, B, C and D after curing at elevated temperature.

If pre-reaction products are produced with the amines according to the invention in combination with resin A, better stabilities on storage can be achieved than with 4,4'-diaminodiphenylmethane and the cycloaliphatic amine 4,4'-diaminodimethylcyclohexylmethane which are used industrially.

What is claimed is:

1. A curable mixture comprising (a) a polyepoxide compound having on average more than one epoxide group per molecule and (b) a hydroxyl groups containing diamine of the formula Ia or Ib

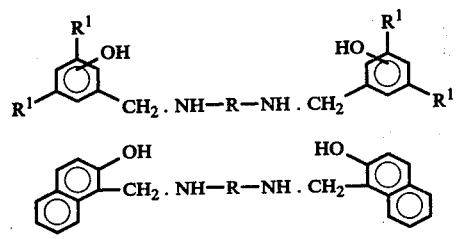

in which R denotes a straight-chain or branched alkylene having a total of 2 to 16 C atoms, an aralkylene having a total of 7 to 12 C atoms, an arylene having a total of 6 to 16 C atoms, a cycloaliphatic or cycloaliphatic-aliphatic radical having 6 to 12 C atoms or a radical which contains at least one N, O or S atom in chains or cyclic groups and $R_1$ denotes hydrogen, halogen or alkyl group having 1 to 4 C atoms, and in which, in formula Ia, the two OH groups are in the ortho-position or para-position relative to the methylene group, there being, in the mixture, 0.5 to 1.5 equivalents of active hydrogen atoms, which are bonded to nitrogen and oxygen in the diamine containing hydroxyl groups, per 1 equivalent of epoxide groups.

2. A mixture according to claim 1, which comprises a bis-(2-hydroxybenzyl)-diamine of the formula II

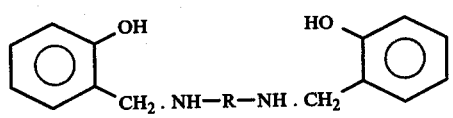

in which R denotes straight-chain or branched alkylene having a total of 2 to 16 C atoms or aralkylene having a total of 7 to 12 C atoms or arylene having a total of 6 to 16 C atoms or a radical which contains at least one N, O or S atom in chains or cyclic groups.

3. A mixture according to claim 2, which comprises a bis-(2-hydroxybenzyl)-diamine of the formula II in which R denotes unbranched or branched alkylene having 2 to 12 C atoms.

4. A mixture according to claim 2, which comprises a bis-(2-hydroxybenzyl)-diamine of the formula II in which R denotes a divalent residue of the formula III

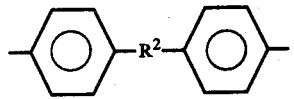

in which $R^2$ denotes —SO$_2$—, —NH— or —O—, or in which R is a divalent residue of the formula IV

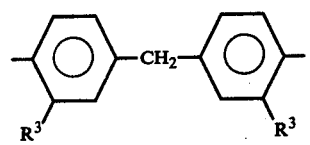

in which $R^3$ denotes —H or —CH$_3$, or in which R is a divalent residue of the formula V

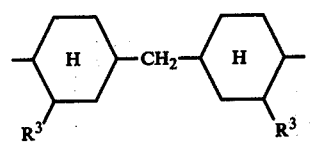

in which $R^3$ denotes —H or —CH$_3$.

5. A mixture according to claim 4, which comprises a bis-(2-hydroxybenzyl)-diamine in which R is of the formula IV and $R^3$ is —H or —CH$_3$.

6. A mixture according to claim 2, which comprises a bis-(2-hydroxybenzyl)-diamine of the formula II in which R denotes a divalent residue selected from the group consisting of

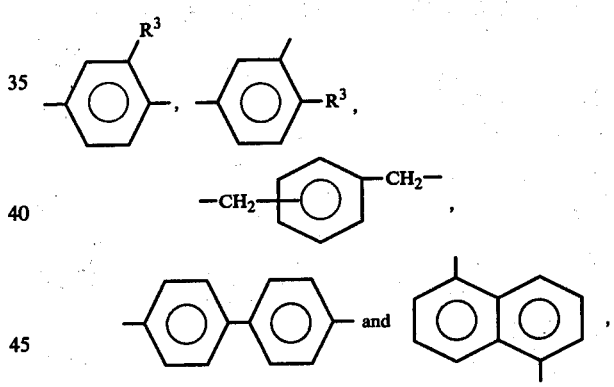

wherein $R^3$ denotes —H or —CH$_3$.

7. A mixture according to claim 1, which comprises a bis-(2-hydroxybenzyl)-diamine of the formula Ia, Ib or II which is solid at room temperature.

8. A mixture according to claim 1, which comprises as the bis-(2-hydroxybenzyl)-diamine of the formula Ia, Ib or II, a compound of this type which has been obtained by catalytically hydrogenating a bisazomethine of the formula

in the presence of inert organic solvents at temperatures of 20° to 150° C and subsequently freeing the product from the catalyst and solvents.

9. A mixture according to claim 1, wherein the said mixture is in the form of a B-stage which is stable on storage.

* * * * *